United States Patent Office 3,250,807
Patented May 10, 1966

3,250,807
DICARBOXYLIC ACIDS OF FLUOROCARBON ETHERS AND FLUORIDES, ESTERS, AMIDES AND SALTS THEREOF
Charles Gerhard Fritz and Earl Phillip Moore, Wilmington, Del., assignors to E. I. du Pont de Nemours and Company, Wilmington, Del., a corporation of Delaware
No Drawing. Filed Aug. 23, 1963, Ser. No. 304,259
6 Claims. (Cl. 260—535)

This application is a continuation-in-part of, copending application S.N. 160,653, filed December 19, 1961, now abandoned.

The present invention relates to novel fluorocarbon ethers, and more particularly to fluorocarbon ether acids and acid derivatives.

The fluorocarbon ethers of the present invention have the general formulas:

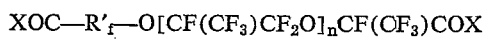

and

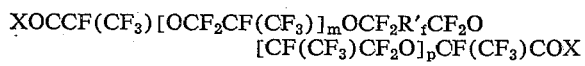

where X is a halogen, hydroxyl, amino, or an —OMe radical in which Me is a monovalent metal, an ester or an ammonium radical, $R'_f$ is a perfluoroalkylene radical of one to twenty-one carbon atoms, $n$ is a number from zero to 35 inclusive and where $m$ and $p$ are numbers, the sum of which is from zero to 35 inclusive.

The fluorocarbon ethers of the present invention are obtained by the reaction of diacid difluorides with hexafluoropropylene epoxide. The diacid difluorides employed in the formation of the fluorocarbon polyethers of the present invention are in particular oxalyl difluoride and perfluoroalkandioic acid difluorides. Specific examples of the latter are the difluorides of perfluoroglutaric acid, perfluoromalonic acid, perfluoroadipic acid, perfluoropimelic acid, perfluorosuberic acid, perfluoroazelaic acid, and perfluorosebacic acid.

The reaction of the acid fluorides with the hexafluoropropylene epoxide is carried out by various means. Thus, the reaction can be carried out in bulk using either activated charcoal or high energy, particulate ionizing radiation. Although temperature is not a critical factor in this reaction, it is preferred to carry the reaction out at temperatures of —50 to +80° C.

In another method, the reaction products of the present invention are obtained by reacting the hexafluoropropylene with the acid fluoride in a polar organic solvent. Suitable solvents are organic solvents liquid at the reaction temperature and capable of dissolving, i.e., to an extent of greater than 0.01 weight percent, perfluorocarbon alkoxides of alkali metals and, specifically, potassium perfluoropropoxide. The perfluoroalkoxides can be formed by reaction of metal fluorides with perfluoroacyl fluorides. In particular, however, the preferred organic solvents are aliphatic polyethers having from 4 to 10 carbon atoms and hydrocarbon nitriles having from 2 to 10 carbon atoms, such as the dimethyl ether of diethylene glycol, dioxane, propionitrile, benzonitrile and acetonitrile. Other highly polar solvents which meet the foregoing qualifications but which are not nitriles nor polyethers include dimethyl sulfoxide, N-methyl pyrrolidone, nitroethane and tetrahydrofuran.

The catalysts which are employed in combination with the solvent are monovalent metal fluorides, particularly alkali metal fluorides, quaternary ammonium fluorides and alkali metal perfluoroalkoxides. The metal fluorides may be used as such or admixed with other alkali metal halides. Such mixtures are, for example, mixtures of LiCl/CsF, LiCl/KF and LiBr/KF. Catalyst concentration is not critical and amounts of catalyst are determined by the environment in which the reaction is carried out. In general, the concentration of the catalyst is at least 0.01% by weight of the hexafluoropropylene epoxide. The catalyst may be present either in solution or as a separate phase.

Reaction temperatures may be greatly varied from —80° C. to 200° C., although a preferred range is from —30° C. to 100° C. Pressures ranging from below atmospheric pressure to several hundred atmospheres have been employed and it has been established that pressure is not a critical factor in the process. Pressure is primarily employed for convenience depending on the physical properties of the reactants at any selected reaction temperature. It will be apparent that the ethers of the present invention are obtained by addition of one or more hexafluoropropylene epoxide molecules to the acid fluoride molecule. The degree of polymerization obtained depends on the catalyst, the temperature, and on the ratio of the acid fluoride to the epoxide. At the high temperatures of the above indicated range a lower degree of polymerization is obtained than at the low end of the temperature range, as a result of competing side reactions which occur at the high temperatures. A ratio of acid fluoride to epoxide which is one or greater than one results in only the monoaddition product. As the ratio is decreased, products with higher degrees of polymerization are obtained. It is, however, to be realized that this control over the nature of the fluorocarbon ethers produced in the reaction is not absolute and does not prevent the formation of some fluorocarbon ethers of either higher or lower molecular weight or both.

The fluorocarbon ethers of the present invention are obtained from the reaction in the form of the acid fluoride and have the above indicated formulas. The acid fluoride form of the ether is readily converted to the acid form by contact with water. The fluorocarbon ether dicarboxylic acids are strong fluorocarbon acids that have chemical reactivity which is analogous to that of other fluorocarbon acids insofar as the carboxylic acid group is concerned. Thus, the acids and also the acid fluorides react with alkylamines and aralkylamines, such as methyl amine, dimethyl amine, butyl amine, higher normal and branched primary and secondary amines, benzyl amine, benzedrine and phenyl ethyl amines. Diamines, such as hexamethylene diamine, may also be employed in the formation of the amide. Esters can be formed by reaction with alkanols and aromatic alcohols such as methanol, ethanol, phenol, benzyl alcohol and glycols. Metal salts are formed from the acid or the acid fluorides by reaction of the oxides and hydroxides of both monovalent and polyvalent metals such as the alkali metals, the alkaline earth metals, aluminum and metals of Groups II B and III B of the Periodic Table of Elements. Reaction of the sodium salt with NH4 or quaternary ammonium salts, $(R_4N)^+X^-$, where R is a hydrocarbon radical gives rise to the corresponding fluorocarbon ether ammonium salts.

The preparation of the novel fluorocarbon ethers of the present invention is further illustrated by the following examples. Unless otherwise stated, all parts and percentages used herein are by weight.

*Example I*

Into a 30 ml. stainless steel cylinder was charged 1 g. of "Darco" activated carbon, 18 g. of hexafluoropropylene epoxide and 4.3 g. of oxalyl fluoride.. The cylinder was allowed to stand at room temperature for 22 hours. Distillation of the product gave 2.4 g. of perfluoro-2,7-dimethyl-3,6-dioxaoctanedioyl fluoride, B.P. 98 to 100° C. An infrared spectrum of the product was consistent with the assigned structure.

Example II

Into a glass reaction vessel was placed 9 g. of cesium fluoride, 90 ml. of diethylene glycol dimethyl ether and 73 g. of perfluoroglutaryl fluoride. The reaction was cooled in ice and stirred rapidly. There was then added 120 g. of hexafluoropropylene epoxide at such a rate that the pressure in the flask did not exceed 5 p.s.i.g. Work-up of the recation mixture afforded perfluoro-2,10-dimethyl-3,9-dioxaundecanedioyl fluoride, B.P. 156 to 158° C., in 80% yield based on perfluoroglutaryl fluoride. The nuclear magnetic resonance and infrared spectra of the product were consistent with the assigned structure. Similar results are obtained when potassium fluoride or a mixture of potassium fluoride and lithium bromide is employed.

The acid fluoride was converted to the disodium salt of perfluoro-2,10-dimethyl-3,9-dioxaundecanedioic acid by hydrolyzing the acid fluoride to the acid by addition of water and neutralizing the resulting solution with NaOH. A smaller quantity of the monoaddition product $FOC(CF_2)_4OCF(CF_3)COF$ was also obtained.

Example III

Into a glass flask is charged 0.8 g. of cesium fluoride, and 50 ml. of dimethyl ether of diethylene glycol. The flask is evacuated and 16.5 g. of perfluoromalonyl difluoride is added. The flask is then cooled to 0° C. and 31 g. of hexafluoropropylene epoxide is added. The flask is agitated for period of 16 hours. On filtration, separation and distillation there is obtained 3 g. of $$FOC—CF_2—CF_2—OCF(CF_3)COF$$

and 13.3 g. of $$FOC—CF(CF_3)—O—(CF_2)_3—OCF(CF_3)COF$$

Example IV

Into a dry, clean 500 cc. round bottom flask containing a magnetic stirrer and flushed with nitrogen were placed 10 g. of dry cesium fluoride and 55 cc. of dry dimethyl ether of diethylene glycol. There was then added 61 g. of perfluoroglutaryl fluoride. The reaction mixture was cooled to −22° C. and hexafluoropropylene oxide was added with stirring over a 3½ hour period at −22 to −20° C. A total of 225 g. of hexafluoropropylene oxide was added. Fractionation of the crude reaction mixture afforded the following fractions: (1) boiling point 80° at 300 mm. to 110° at 100 mm., 112 cc. (54 cc. dimethyl ether of diethylene glycol plus 58 cc. fluorocarbon layer); (2) boiling point 155° at 100 mm. to 160° at 70 mm., volume 26 cc.; (3) boiling point 160° at 70 mm. to 165° at 40 mm., volume 51 cc.; (4) boiling point 165° at 40 mm. to 172° at 22 mm., volume 31 cc. Fractions 2, 3 and 4 were combined and titrated with standard base to give a neutralization equivalent of 276. This corresponds to a molecular weight of 1104. The calculated molecular weight for a mixture of compounds of structure

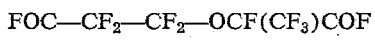
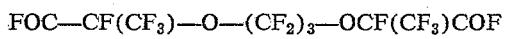

where the sum of $m+p$ is an average of 3, is 1074.

The combined fractions were treated with excess methanol. Excess methanol and hydrogen fluoride were removed under vacuum. Distillation of the fluorocarbon material afforded a series of fractions boiling from 88° at 0.5 mm. to 133° at 0.25 mm. Infrared and NMR spectra on the components of this mixture obtained by preparative scale gas chromatography showed them to have the structure

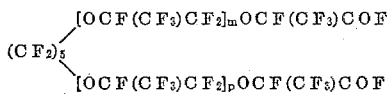
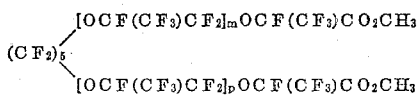

where $m+p$ ranged from 1 to 4. The total weight of esters obtained was 166 g.

Example V

Into a 300 ml. stainless steel cylinder was placed 3 g. of cesium fluoride. The cylinder was attached to a manifold and evacuated and then charged with 40 ml. of the dimethyl ether of diethylene glycol. Thereafter the cylinder was cooled to −80° C. and 27 g. of oxalyl fluoride and 91 g. of hexafluoropropylene epoxide was introduced. The cylinder was allowed to warm to room temperature under autogenous pressure and intermittently agitated for 5 days. On separation, there was obtained 28.1 g. of a liquid fluorocarbon product. The product was combined with 13.3 g. of a similar product of the second run and distilled. There was obtained 3.3 g. of $$FOCCF_2OC(CF_3)COF$$

boiling at about 50° C. and 8.4 g. of $$F—OCCF(CF_3)—O—CF_2—CF_2—O—CF(CF_3)COF$$

boiling at 98 to 101° C. Contact with water hydrolyzes both compounds to the corresponding dicarboxylic acids.

Example VI

Into a glass flask is charged 60 ml. of acrylonitrile and 1.0 mole of potassium fluoride per liter of solvent. The flask is evaporated and 1 mole of perfluoroglutaryl fluoride is added. The flask is cooled to 0° C. and gaseous hexafluoropropylene epoxide is charged into a flask until a pressure of 5 p.s.i.g. is built up. The reaction was continued until no further hexafluoropropylene epoxide was taken up by the reaction mixture. Filtration, separation, and distillation gave a 23% yield of $$FOC(CF_2)_4OC(CF_3)COF$$

and an 18% yield of $$FOCCF(CF_3)—O—(CF_2)_5—O—CF(CF_3)COF$$

Example VII

Using the procedure of Example VI, but employing tetrahydrofuran as the solvent and cesium fluoride as the catalyst, a 67% yield of the monoaddition product and a 3% yield of the diaddition product is obtained.

The foregoing examples have illustrated the formation of the fluorocarbon ethers of the present invention. It is apparent from these examples that the chemical activity of the acid end groups of these fluorocarbon ethers is typical of that of any fluorocarbon acid. The fluorocarbon acid derivatives disclosed herein but not specifically illustrated are formed by conventional methods developed for the preparation of analogous derivatives of fluorocarbon acids which do not contain ether oxygens.

The fluorocarbon ethers of the present invention are useful as such or as chemical intermediates. In the carboxylic acid form or in the form of the sodium or ammonium salt the fluorocarbon ethers are outstanding, thermally and chemically stable dispersing agents. The stability of the esters or amides of fluorocarbon ethers allows their use as high temperature heat transfer media and also as lubricants. The fluorocarbon ethers of the present invention, in view of their particular end group structure, i.e.,

can alse be decarboxylated to result in vinyl ethers which have utility as monomers in the formation of thermosetting resins.

We claim:
1. A fluorocarbon ether having the formula

$$XOCCF(CF_3)\text{-}[OCF_2CF(CF_3)]_mOCF_2R'_f$$
$$CF_2O[CF(CF_3)CF_2O]_pCF(CF_3)COX$$

where X is a radical selected from the class consisting of halogen, hydroxyl, amino and —OMe radicals, where Me is selected from the class consisting of monovalent metals, alkyl radicals, aryl radicals, the benzyl radical and the ammonium radical, $R'_f$ is a perfluoroalkylene radical of zero to twenty-one carbon atoms, where $m$ and $p$ are numbers, the sum of which is from zero to 35.

2. A fluorocarbon ether having the formula:

$$FOC(CF_3)CFOCF_2R'_fCF_2OCF(CF_3)COF$$

where $R'_f$ is a perfluoroalkylene radical of zero to twenty-one carbon atoms.

3. The fluorocarbon ether of claim 2 wherein the perfluoroalkylene radical is a perfluorodimethylene radical.

4. The fluorocarbon ether of claim 2 wherein the perfluoroalkylene is a perfluorotetramethylene radical.

5. The fluorocarbon ether of claim 2 wherein the perfluoroalkylene radical is a perfluoromethylene radical.

6. A fluorocarbon ether having the formula:

$$HOOC(CF_3)CFOCF_2R'_fCF_2OCF(CF_3)COOH$$

where $R'_f$ is a perfluoroalkylene radical of zero to twenty-one carbon atoms.

References Cited by the Examiner
UNITED STATES PATENTS
2,839,513   6/1958   Ahlbrecht _____ 260—555 X FOREIGN PATENTS
599,948   6/1960   Canada.

LORRAINE A. WEINBERGER, Primary Examiner.

LEON ZITVER, Examiner.

DENNIS P. CLARKE, RICHARD K. JACKSON,
Assistant Examiners.